A. C. KASSON.
Domestic Boiler
No. 84,194.
Patented Nov. 17, 1868.
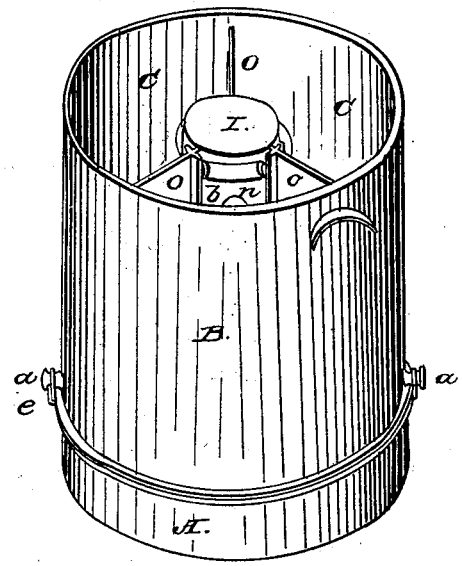
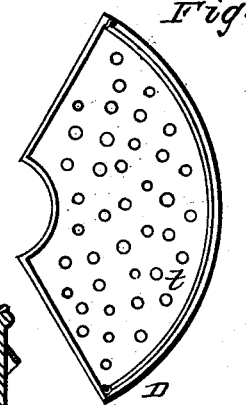
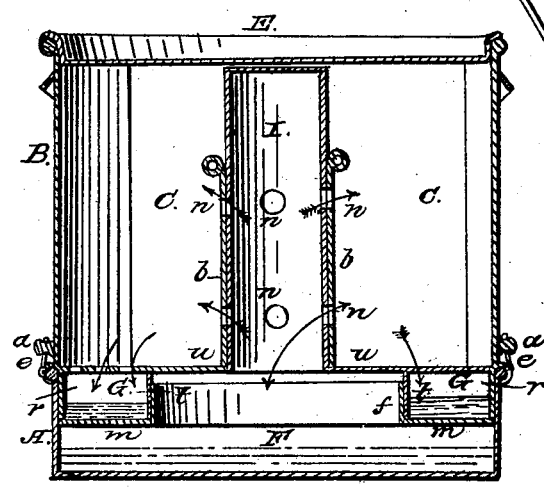
Witnesses
P. T. Dodge
Am Lind
Inventor,
A. C. Kasson
by Dodge & Munn
his attys

A. C. KASSON, OF MILWAUKEE, WISCONSIN, ASSIGNOR TO HIMSELF AND NELSON C. GRIDLEY, OF SAME PLACE.

Letters Patent No. 84,194, dated November 17, 1868.

IMPROVEMENT IN CULINARY VESSELS.

The Schedule referred to in these Letters Patent and making part of the same.

*To all whom it may concern:*

Be it known that I, A. C. KASSON, of Milwaukee, in the county of Milwaukee, and State of Wisconsin, have invented certain new and useful Improvements in Steam-Cooking Vessels; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in a novel construction of a vessel for cooking food by steam, whereby several varieties of food may be cooked at once in the same vessel, without impregnating any one of the varieties of food with the flavor of any of the other varieties, as hereinafter more fully explained.

Figure 1 is a perspective view,

Figure 2, a vertical section, and

Figure 3, a top plan view of a vessel used in one of the compartments.

In constructing my improved apparatus, I first make the base or boiler A, which consists of a flat or shallow vessel, made preferably of tin or copper, with an annular diaphragm, $m$, extending inward about one-fourth of the diameter of the vessel, and having attached to the inner edge of the diaphragm a vertical flange, $f$, which extends upwards nearly even with the top of the boiler A, as represented in fig. 2.

The diaphragm $m$, being connected to the vessel A, at about midway of its height, divides the boiler into two chambers, the lower chamber, F, occupying the lower half of the vessel, and extending entirely over the bottom, together with the central space within the vertical flange $f$, this chamber being intended for containing the water from which the steam is to be generated. The other chamber, G, is annular in form, and occupies the space between the outer wall of the vessel or boiler A and the flange $f$, and being directly over the outer portion of the chamber F, this chamber G being intended to receive and retain the drip or condensed steam after it has passed through the compartments where the food is being cooked.

Upon this boiler A, I place the cooking-vessel B, which consists of a vessel divided vertically by partitions $o$ into any desired number of compartments, and having a central vertical tube, I, closed at top and open at bottom, the partitions $o$ being arranged radially around this tube I, and extending from the tube outward to the outer wall of the vessel, as represented in fig. 1.

The tube I has one or more holes, $n$, made in it, at suitable points, to communicate with each of the compartments C, as shown in fig. 2.

The vessel C has its outer wall extending down below the bottom, $u$, far enough to reach to the bottom of the chamber G, as shown at $r$ in fig. 2, and another flange, $t$, of the same depth, is secured to the under side of the bottom, $u$, in such a position as to fit down in the chamber G, just outside of the flange $f$ of the boiler A.

That portion of the bottom, $u$, between the flanges $r$ and $t$, and which rests over the chamber G, is perforated, while the rest is left whole, except at the centre, where the tube I is attached, as shown clearly in fig. 2.

This vessel, B, is provided with a cover, E, which may be recessed, as represented in fig. 2, to serve as a sauce-pan; and it should fit down upon the partitions $o$ as snugly as possible.

Slides $b$ are provided, as shown in figs. 1 and 2, by which the openings $n$ may be closed or opened at will.

If desired, a vessel, D, corresponding in form with the compartments C, may be provided for one or all of the compartments, the bottom, or the entire body of which should be perforated, as shown in fig. 3.

The manner of using the apparatus is as follows:

The various kinds of food to be cooked are placed separately in the different compartments C, and the boiler A, having its chamber F supplied with water, the latter is set on the stove, and the vessel B is set thereon, and the two secured together by means of the rings $e$ on the boiler being hooked over the knobs $a$, the cover E being also put on.

As soon as the water boils, the steam ascends into the tube I, and passes through the openings $n$ into the compartments C, where it acts upon the vegetables or other articles placed therein, from whence, as it is condensed, it drips down through the perforated bottom $u$ into the chamber G, into which a very little water should be placed in the first instance.

As the water in this chamber G effectually seals the joint around the lower edge of the flanges $t$ and $r$, it follows that no steam can pass back into the boiler-chamber F or the tube I, and consequently the steam bearing the flavor of the articles in any one compartment cannot come in contact with the contents of either of the other compartments, to affect or flavor them.

The water formed by the condensation of the steam, instead of flowing back into the chamber F, is caught and retained in the chamber G, and consequently it cannot mingle with the boiling water or steam, and therefore it cannot affect the contents of the compartments C.

As the pressure of the steam is uniform in all of the compartments C, there will be no tendency for it to pass from one to another over the top of the partitions $o$; but to render this absolutely impossible, there may be a water-chamber formed along the top of each partition by soldering on to the side of each a narrow strip, thus forming a gutter or narrow channel, open at top, into which water may be placed, and then securing to the under side of the cover a narrow vertical flange, to fit down into the water-chamber or gutter, thus sealing, by a water-joint, the communication between the adjoining compartments C, and preventing the possibility of the steam passing from one to another of the compartments.

By this method of constructing the apparatus, it will be seen that several varieties of food may be cooked at once in the same vessel, without in any manner interfering with or affecting each other, and each be got at any time, independent of the others.

If it be desired to make soup at the same time, it can be done by placing the meat in the chamber G, the drip-water from the various compartments supplying the fluid portion, and cooking the meat, and at the same time adding and combining more or less of the flavor and extract from all the varieties of vegetables contained in the various compartments.

When only one or less than all of the compartments C is being used, the steam may be cut off from those not in use, by means of the slides $b$, and thus, when the contents of one or more are sufficiently cooked, the steam may be cut off, and all thrown into the remaining chambers, and if the vessels D be used, they may be at once removed, or left in to keep the articles hot until all are done and wanted for use.

Having thus described my invention,

What I claim, is—

1. The vessel B, provided with its central steam-chamber or tube I, with its openings and slides, and a series of compartments, C, constructed and arranged to operate substantially as described.

2. The vessel A, provided with the compartment F and the drip-chamber G, substantially as and for the purpose set forth.

3. The combination of the vessels A and B, the latter having the annular flange $t$ fitting into the drip-chamber G of the former, when said parts are constructed and arranged for joint operation substantially as set forth.

A. C. KASSON.

Witnesses:
W. C. DODGE,
P. T. DODGE.